Nov. 3, 1953     H. L. MacBRIDE     2,657,921
WEIGHING DEVICE

Filed June 4, 1948     2 Sheets-Sheet 1

Inventor
Herbert L. MacBride
By Richmond S. Hayes
Attorney

Nov. 3, 1953   H. L. MacBRIDE   2,657,921
WEIGHING DEVICE
Filed June 4, 1948   2 Sheets-Sheet 2

Inventor
Herbert L. MacBride
By Richmond S. Hayes
Attorney

Patented Nov. 3, 1953

2,657,921

UNITED STATES PATENT OFFICE 2,657,921

WEIGHING DEVICE

Herbert L. MacBride, Fort Washington, Pa.

Application June 4, 1948, Serial No. 31,041

6 Claims. (Cl. 265—27)

This invention relates to weighing devices and more particularly to structure intended to take the place of the well known lever system of scales or other physical equipment wherein a gravity load, weight, or pressure may be weighed and the amount read on a suitable indicator.

Prior to this invention, many of the weighing devices have reduced the applied load through the use of levers or series of levers in order that the final balancing or load indicator might be of convenient proportions and usefulness. In large capacity scales or similar machines, the various levers and linkages are subject to heavy bending stresses. Consequently, they are necessarily more or less massive, cumbersome and difficult to adjust to give the required accuracy of calibration and also the proper sensitivity to any small changes in load. It can be fairly stated that weighing devices, up to and including those of the heavy duty type, by reason of the ruggedness of their parts, possess considerable inertia which often causes the indicated load to tend to lag behind or over-shoot the actually applied load, and this is particularly true if there happens to be any rapid fluctuation in the applied load.

More specifically, the present invention is designed to take the place of the usual lever system of a weighing device and be produced from lighter and more compact parts without lessening in any way the efficiency and accuracy thereof, and this therefore constitutes one of the more important advantages and objects.

Another object of the invention lies in the provision of a weighing device that includes relatively movable parts which are unusually free from inertia effects.

Another important object of the invention lies in the provision of operative parts so constructed and arranged as to be readily removable for inspection, repair, or replacement.

A still further object of the invention lies in the provision of means that may be conveniently altered to adjust the calibration thereof.

Additionally, it is considered to be an important advantage of the invention to provide a weighing device that is inexpensive to manufacture, since the parts thereof readily lend themselves to convenient and economical manufacturing operations and for the most part thereby eliminate the usual careful handcraft that is so frequently found in lever type scales.

Other important objects and advantages of the invention will be more fully understood from a consideration of the following specification, taken in conjunction with the accompanying drawings; and in which Fig. 1 is a perspective view of a device embodying one form of the invention, certain parts being broken and sectioned for convenience of disclosure;

Figure 1:
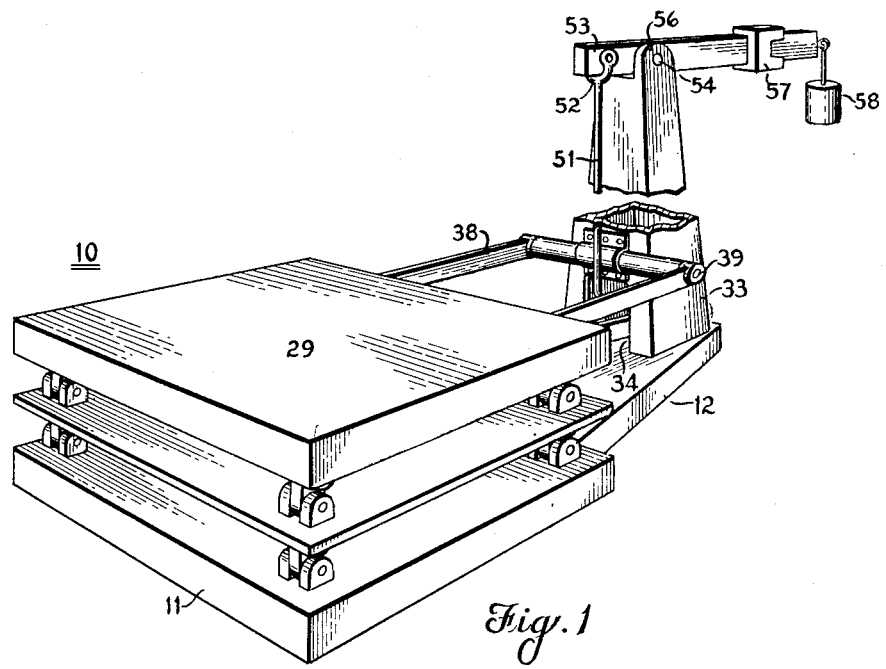
Figure 2:
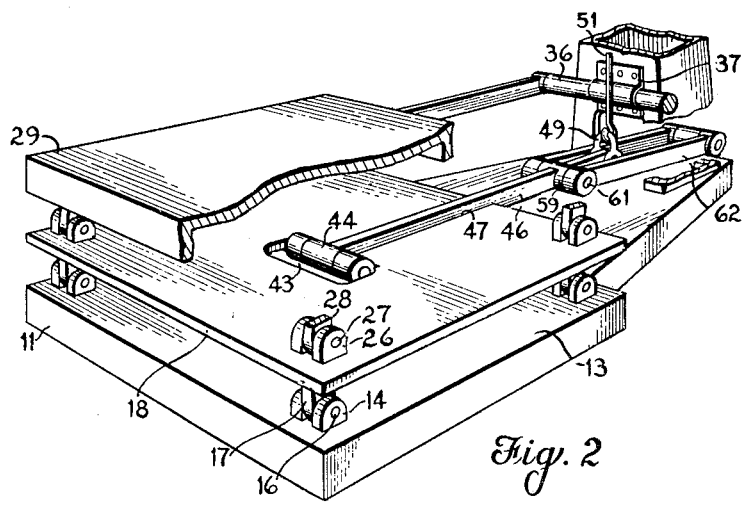
Fig. 2 is a perspective view similar to Fig. 1, parts being broken away to show certain of the structural details.
Figure 3:
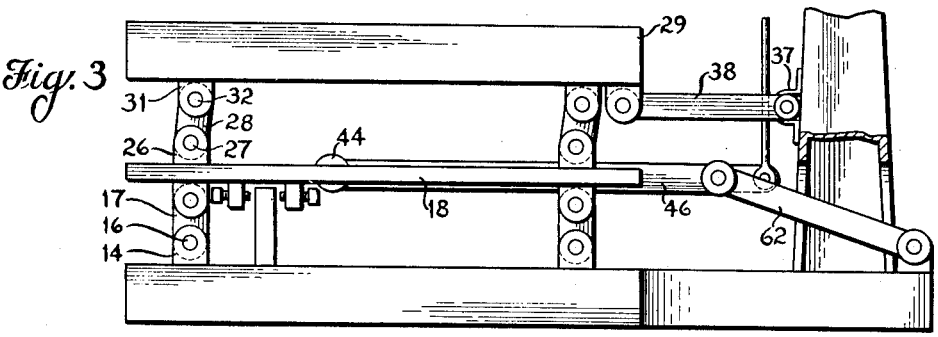
Fig. 3 is a side elevational view of the embodiment shown in Fig. 1 with parts of the support and weight indicating structure removed.
Figure 4:
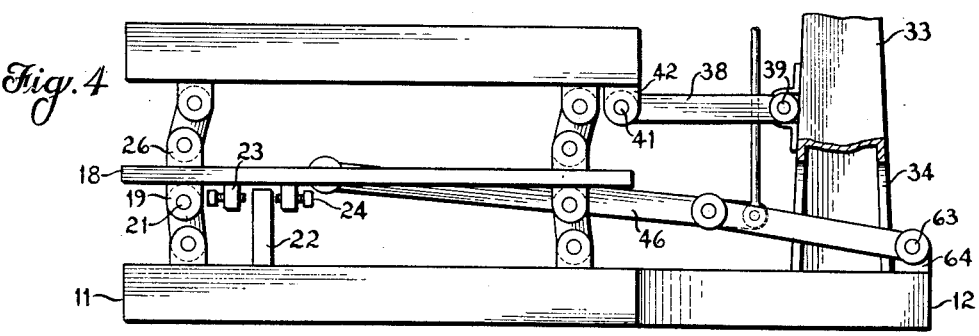
Fig. 4 is a view similar to Fig. 3 showing the change in position of the parts when a load is applied to the platform.

Referring more particularly to the drawing, the reference numeral 10 is employed to generally designate a weighing device embodying the present invention. This device, for purposes of illustration, is shown in the form of a platform type of scale which utilizes a beam and balance as a means of indicating the weight or force of a load. It will of course be understood that other weight or load indicating means may be employed since the draft rod could very readily be associated with some other type of indicating mechanism. A base 11 is provided which includes an extension or continuation 12. The particular depth, size, or contour of the base is of no importance in the present invention and is merely shown to be sufficiently rugged to support the operative parts of the device and any weight or load to be tested. Extending upwardly from the top surface 13 of the base are pairs of spaced lugs 14. These pairs of lugs, for convenience in load distribution, are located adjacent each of the four corners of that portion of the base that includes the surface 13. The lugs are provided with concentric holes adapted to receive pins 16. The spacing of the lugs 14 of each pair is such that one end of a leg 17 may be located therebetween. This end of the leg is apertured and supported by the lugs 14 through the pin 16. An intermediate plate 18 is provided. This plate, for purposes of illustration, is shown to be of rectangular form, corresponding approximately to the form of the top 13 of the base 11. Depending from this plate are pairs of lugs 19 which may be identical, as to size, and arrangement, with the lugs 14 previously described. The upper ends of the legs 17 are projected into the space between the lugs 19 and, being apertured, are secured to the plate 18 by pins 21. Inasmuch as the legs 17 are mounted to swing about their pivots in the same direction, it is evident that the plate 18 may have movement toward the base 11 in either of two directions and at the same time maintain its parallel relationship with respect to said base.

Since it is desirable to limit the extent of movement of the plate with respect to the base, limiting means is provided which may take the form shown in the drawing. Herein a bar 22, mounted on the top 13 of the base, extends upwardly to within a short distance of the under face of the plate 18. A pair of spaced apart blocks 23 depend from the under face of the plate and are fitted with screws 24. These screws may be turned to bring their inner ends into close proximity with the upper end of the bar and thus limit the extent of movement of the plate 18 on its supporting legs 17.

Further sets of lugs 26 project upwardly from the top surface of the plate 18. For convenience of disclosure, these sets of lugs may be identical in location and proportions with the lugs previously described. Each of these sets of lugs is fitted with a pin 27 that engages the lower end of an upper leg 28. A platform or weighing table 29, shown to be of approximately the same area as the plate 18, is provided with depending sets of lugs 31 which are fitted with pins 32 that engage the upper ends of the upper legs 28. It will of course be understood that the invention thus far described is not limited to the relative proportions shown for the legs 17 and 28 or plate 18, and that these parts represent one form of structure intended for use between a fixed support and any load sustaining means.

The extension 12 of the base 11 mounts a standard 33. This standard may be hollow as indicated in the drawing, and formed with archway openings 34 on opposite sides thereof. Slightly above the inner archway, the standard mounts a rod 36. This rod may be secured in any suitable manner to the standard such, for example, as by welding or through the use of the strap-like bracket 37 shown in the drawing. In the present disclosure, the ends of the rod extend beyond the lateral limits of the standard and serve to support corresponding ends of a pair of parallel links 38 by means of pivot pins 39. The other ends of the links 38 are joined through pins 41 to sets of lugs 42 that depend from an end of the weighing platform 29. It will be apparent that links 38 serve to control or prescribe a path of downward and upward movement for the platform by causing it to swing in an arc that has its center in the pins 39. These links also determine the extent of incline of legs 28 which, as will later be brought out, is of importance in calibrating the device.

The plate 18 is formed with a central aperture 43. One of the walls of this aperture mounts a bearing 44 located at one end of an arm 46. A further slot 47, in the plate 18, normally receives the arm 46. The other end of arm 46 is fitted with a bail 49 to which one end of a draft rod 51 is secured. The other end of this rod (see Fig. 1) terminates in a yoke 52 that pivotally engages one end of a beam 53. Adjacent the yoke 52, the beam is pivotally supported, as indicated at 54, by upstanding lugs 56 on the standard 33. The lower end of the beam mounts the usual poise 57 and weight 58. At a predetermined point between the ends of arm 46, a pivotal connection 59 is provided which, through a pin 61, connects said arm with corresponding ends of a pair of parallel links 62. These links project through the archway 34 and are secured for pivotal movement by a pin 63 carried by lugs 64 that extend upwardly from the extreme end of the base extension 12.

Figure 6:
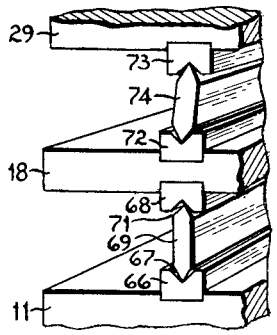
Fig. 6 is an enlarged fragmentary perspective view of a part of the platform supporting structure shown in the modification of Fig. 5.
Figure 5:
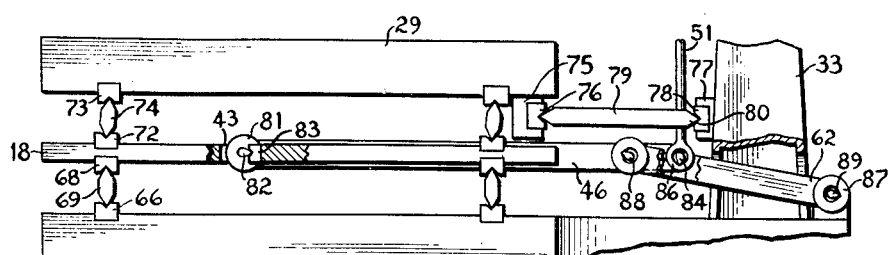
Fig. 5 is a side elevational view of a modification of the structure, showing the use of low inertia operative parts.

A modification of the structure described is shown in Figs. 5 and 6 of the drawing. For convenience of disclosure, those parts similar to the parts previously described bear the identical reference numerals; only the parts embodying the modification being set out in detail. Referring particularly to Fig. 6, it will be noted that the base 11 is fitted with two elongated blocks 66, having upwardly opening, V-shaped recesses 67. The intermediate plate 18 is provided with two blocks 68 that depend from its under surface. These last named blocks are each formed with a downwardly opening, V-shaped recess. A bar 69, of approximately the length of block 66, is formed with pointed edges 71. The lower edge of each bar rests in the recess 67 of block 66, whereas the upper edge is seated in the V-shaped recess of the plate blocks 68. Secured to the upper face of the plate 18 and the under face of the platform 29, are further blocks 72 and 73 respectively, and of course the platform is supported in spaced relationship to the plate by further or upper bars 74. It will be evident that this modification of the invention provides support for the plate 18 and platform 29 through the use of members having little inertia effect.

A further modification of the structure of Fig. 1 may be successfully utilized in place of the parallel links 38. Following out the use of the bars and blocks above described, it is proposed to provide a depending bracket 75 at one end of the platform 29. Mounted in this bracket is a block 76 that is formed with a laterally extending, V-shaped opening. Secured to the inner face of the standard 33 is a bracket 77. This bracket mounts a block 78, identical to, but arranged in opposed relationship to the block 76. A bar 79 is formed with pointed ends 80 that seat in the recesses of blocks 76 and 78. Bar 79 defines a downward path of movement of platform 29 in a manner similar to the parallel links 38. It will of course be understood that in the initial set-up of the device, bars 74 are slightly inclined in the direction and manner indicated in the drawing and, thus, the end contact of the horizontal bar 79 with its respective blocks is maintained. Furthermore, by changing the length of bar 79 and adjusting one or both blocks 76 and 78, the incline of bars 74 will be altered and a change in calibration effected.

To further carry out the point-contact of the various operative parts as already described in connection with the modification shown in Fig. 5, it will be noted that the inner end of arm 46 is provided with a collar 81 through which a pointed pivot pin 82 projects. The ends of this pin rest in V-shaped blocks 83, secured to one wall of the aperture 43 in plate 18. The other end of arm 46 mounts a pivot pin 84 which, as intended, has point-contact with the looped ends 86 of a bail formed on the lower end of the draft rod 51. Similarly, the ends of the parallel links 62 are formed with bearing rings 87. The bearing rings, at the inner ends of these links, receive a pivot pin 88, carried by the arm 46. The outer bearing rings of these links receive pivot pins 89. It is evident that the modification of Fig. 5 in its entirety presents structure intended to greatly reduce or eliminate any inertia effect by providing point or sharp-edge contact for all of the connected moving parts. It will also be understood that a change in the angular relationship of arm 46 and links 62 will effect a change in the calibration of the device. Such change may be made in conjunction with any change in the angular position of bars 74.

Figure 7:
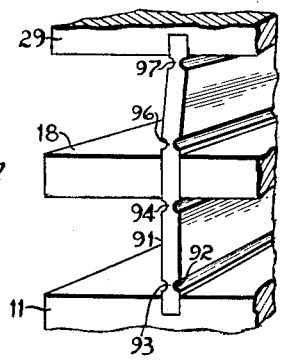
Fig. 7 is a fragmentary perspective view showing a still further modification of the supports for the weighing platform.

A further modification of the invention is suggested in the fragmentary view of Fig. 7. Herein the intermediate plate 18 and platform 29 are supported through the use of plate fulcra members 91. These members may be four in number and located similarly to the legs 17, or two in number and of more extensive proportions such, for example, as the bars 69 and 74. In any case, the lower end of each member is suitably secured to the base 11 and, at a point somewhat above, is formed with opposed grooves or recesses 92 which produce a narrow, flexible, neck-like portion 93. Above the portion 93 the member is of more substantial proportions and again, just beneath the plate 18, a further neck portion 94 is provided. Similarly, directly above the plate 18 and directly beneath the platform 29 this member includes further flexible neck portions 96 and 97 respectively. The upper end of the member is of course rigidly secured, in any suitable manner, to the under side of the platform 29. In this modification, the upper portion of the member 91—that is, the part between plate 18 and platform 29—is slightly inclined in the same manner and probably at the same inclination as the bars 74 shown in Figs. 5 and 6. Herein the flexible neck-like portions serve as the equivalent of the pivotal connections for the legs 17, or the point contacts of bars 69. It is mentioned that, in this modification, a somewhat different arrangement of the various links, bars, and arms must be made to overcome the slight inertia required to flex or bend the member 91 in the manner required. One method of overcoming this would of course be through the use of a longer beam 53 and heavier weights 58. A further means of compensating for this construction might also be to change the relative lengths and locations of the pivotal connections of arm 46, links 62, etc. As the point contact was carried out with all moving parts in the modification of Fig. 5, so may plate fulcra members be substituted for links 38, bar 79, arm 46, and links 62.

Inasmuch as the three modifications of the invention shown operate in the same manner, a description of the use of the device will be directed primarily to the modification shown in Figs. 1 through 4. It will be observed that the legs 17 and 28, or their equivalents in the other modifications, are essentially toggles which are initially set to a predetermined out of line position, this being controlled by adjustment of screws 24. In all modifications these toggles support the weighing platform and thus are at all times under compression. It is also to be noted that arm 46 and links 62 cooperate to form another toggle which, by reason of the pull of poise 57 or weight 58, through draft rod 51, places this toggle under tension. Now, if the initial lateral deflection of legs 28 is one-tenth the leg length, then any given force or load on the platform will cause the toggle under compression to exert a lateral force of one-tenth of the platform load. Similarly, the initial angular deflection of links 62 with respect to arm 46 is one-tenth the links' length. Thus the lateral pull of the toggle under compression tends to straighten the toggle under tension and to an extent that is one-tenth of said lateral pull. It may be assumed that a load or weight is applied to the platform 29. For purposes of explanation, this load is considered to be 1000 pounds. The upper legs 28, that constitute the support and connection between plate 18 and platform 29, are inclined to an extent that lugs 26 are out of the vertical plane of lugs 31 one-tenth of the vertical distance between pins 27 and 32. The inclined legs 28 exert a downward force of a thousand pounds on the intermediate plate 18 but they also exert a horizontal force toward the left, as viewed in the drawing, on said plate and this force to the left, because of the initial inclination of legs 28, would only be one hundred pounds, or one-tenth of the load on the platform. Thus, the intermediate plate 18 will have an initial pull on the horizontal arm 46 of one hundred pounds, or one-tenth of the load on the platform. Links 62, attached to the initially horizontal arm 46, are inclined with respect to this arm at a downward slope of one in ten. Those ends of the links 62 connected with this arm, tend to move downwardly with a force of one-tenth of the horizontal pull of plate 18. Since this horizontal pull has been shown to be one hundred pounds, the point of connection of links 62 and arm 46 would move downwardly with a force of ten pounds, or one-tenth of this horizontal pull. The drawing suggests that arm 46 extends to the right beyond the pivotal connection thereof with links 62. Attached to the end of this arm is draft rod 51, on which said arm exerts a downward pull of less than ten pounds to pivotally move the beam 53. Under these circumstances, arm 46 acts as a lever with fulcra at 44, 61, and 49. The actual amount of downward pull on the rod 51 depends on the ratio of distance 44 to 61 and 44 to 49. The rod 51 might be connected with the arm 46 at some point other than its extreme end and thus the downward force exerted on said rod would be changed and the extent to which the beam was required to move to give an indication of balance would be altered. It will be understood that the drawings serve primarily to illustrate the invention and are not intended to be an accurate reproduction of the parts and their relative lengths and pivotal relationship as set out in the illustration of the one thousand pounds load applied to the platform 29.

Although applicant has shown only one general form of his invention and three variations of a support for a weighing platform or table, it will be understood that the structure may be otherwise modified to further render the device capable of accurately weighing all manner of loads or materials and it is therefore contemplated that such modifications are within the spirit and scope of the invention insofar as they are set out in the annexed claims.

Having thus set forth my invention, what I claim as new and for which I desire protection by Letters Patent is:

1. A device of the class described comprising load sustaining means, said means being movable under the force of an applied load in a given direction, a load indicating mechanism, two toggles arranged in series connecting said load means with said mechanism, one of said toggles being under compression and exerting a predetermined proportion of the force applied thereto by said load means on the other of said toggle, said other toggle being under tension and exerting a predetermined proportion of the force applied thereto on said mechanism.

2. A device of the class described comprising load sustaining means capable of exerting the force of an applied load in a given direction, a base, a first pair of pivotally connected members interposed between and having connection with said load means and said base, one of said members being normally inclined with respect to the direction of force applicable to said members by said load means, a mechanism for indicating the force of a load applied to said load means, a second pair of pivotally connected members, one of the members of said second pair being connected with said first pair of members adjacent the pivotal connection of said first members, and linkage connecting said mechanism with said second pair of members adjacent their pivotal connection and serving to transmit a predetermined proportion of the load to said mechanism.

3. A device of the class described comprising a load sustaining member, a load indicating mechanism, first toggle means under compression supporting said member, and further toggle means under tension connecting said first means with said mechanism, the extent of compression of said first means being initially equal to the extent of tension of said further means.

4. A device of the class described comprising a load sustaining member, a load indicating mechanism, a toggle under initial predetermined compression supporting said member, and a second toggle under initial predetermined tension connecting the first toggle with said mechanism, the relationship of the toggles being such as to exert a predetermined proportion of a load on said member to said mechanism.

5. A device of the class described comprising a load sustaining member, a load indicating mechanism, a first toggle under initial predetermined compression connected at one end with said member, a second toggle under initial predetermined tension connected at one end with the intermediate portion of said first toggle, and linkage connecting an intermediate portion of said second toggle with said mechanism.

6. A device of the class described comprising a load sustaining member, a load indicating mechanism, a first toggle under initial predetermined compression, and a second toggle under initial predetermined tension, said toggles being arranged in series and connecting said load sustaining member with said indicating mechanism whereby to exert a predetermined proportion of the force on said member to said mechanism.

HERBERT L. MacBRIDE.

References Cited in the file of this patent

UNITED STATES PATENTS

| Number | Name | Date |
|---|---|---|
| 334,051 | Redline | Jan. 12, 1886 |
| 2,307,917 | Clewell | Jan. 12, 1943 |
| 2,352,935 | Bohannan | July 4, 1944 |
| 2,395,784 | Honegger | Feb. 26, 1946 |

FOREIGN PATENTS

| Number | Country | Date |
|---|---|---|
| 149,619 | Germany | Nov. 29, 1902 |